Figure 1A:
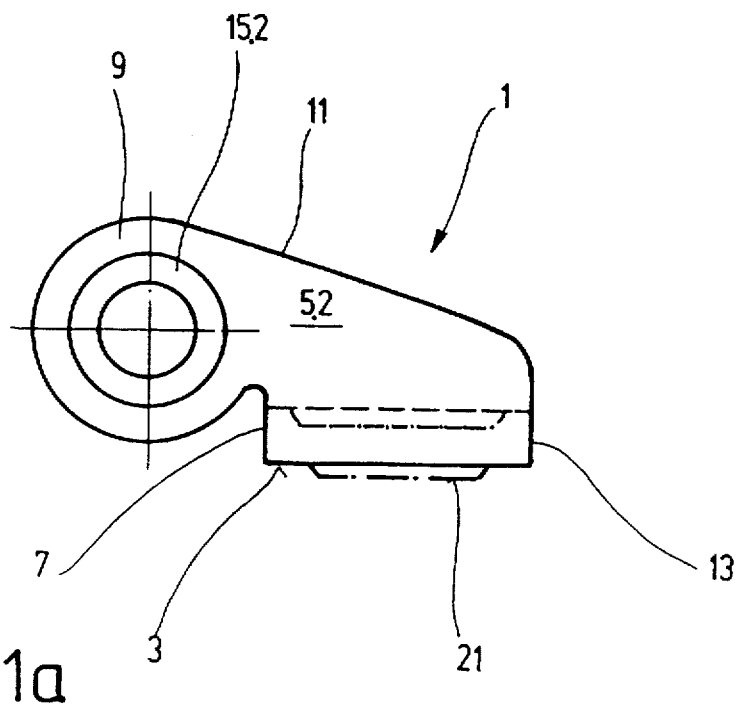

United States Patent [19]
Wagner

[11] Patent Number: 5,797,173
[45] Date of Patent: Aug. 25, 1998

[54] METHOD OF MANUFACTURING A HINGE FOR EYEGLASSES

[75] Inventor: Reiner Wagner, Ispringen, Germany

[73] Assignee: OBE-Werk Ohnmacht & Baumgartner GmbH & Co. KG., Ispringen, Germany

[21] Appl. No.: 580,261

[22] Filed: Dec. 28, 1995

[30] Foreign Application Priority Data

Dec. 20, 1995 [DE] Germany .................. 195 47 817.7

[51] Int. Cl.⁶ .................. B21K 13/02; B23P 17/00
[52] U.S. Cl. .................. 29/11; 29/418; 29/564
[58] Field of Search .................. 29/11, 564, 418; 16/228

[56] References Cited

U.S. PATENT DOCUMENTS

| 2,053,344 | 9/1936 | Lustig | 29/11 |
|---|---|---|---|
| 2,634,655 | 10/1953 | Knowles et al. | |
| 4,283,811 | 8/1981 | George | |
| 4,485,544 | 12/1984 | Van Ryswyk | 29/11 |
| 4,615,086 | 10/1986 | Tabacchi et al. | 29/11 |

FOREIGN PATENT DOCUMENTS

| 0100754 | 2/1984 | European Pat. Off. |
| 0295560 | 12/1988 | European Pat. Off. |
| 1772611 | 2/1970 | Germany |
| 2342314 | 2/1975 | Germany |
| 2822556 | 12/1978 | Germany |
| 3414641 | 10/1985 | Germany |
| 19515495 | 10/1995 | Germany |

Primary Examiner—P. W. Echols
Attorney, Agent, or Firm—Anderson, Kill & Olick, P.C.

[57] ABSTRACT

The invention is directed to a method for fabricating an eyeglass hinge with a twin roller hinge part comprising two legs and a base surface, wherein the hinge part is punched out of a strip shaped material and is subsequently bent into a U-shape.

4 Claims, 5 Drawing Sheets

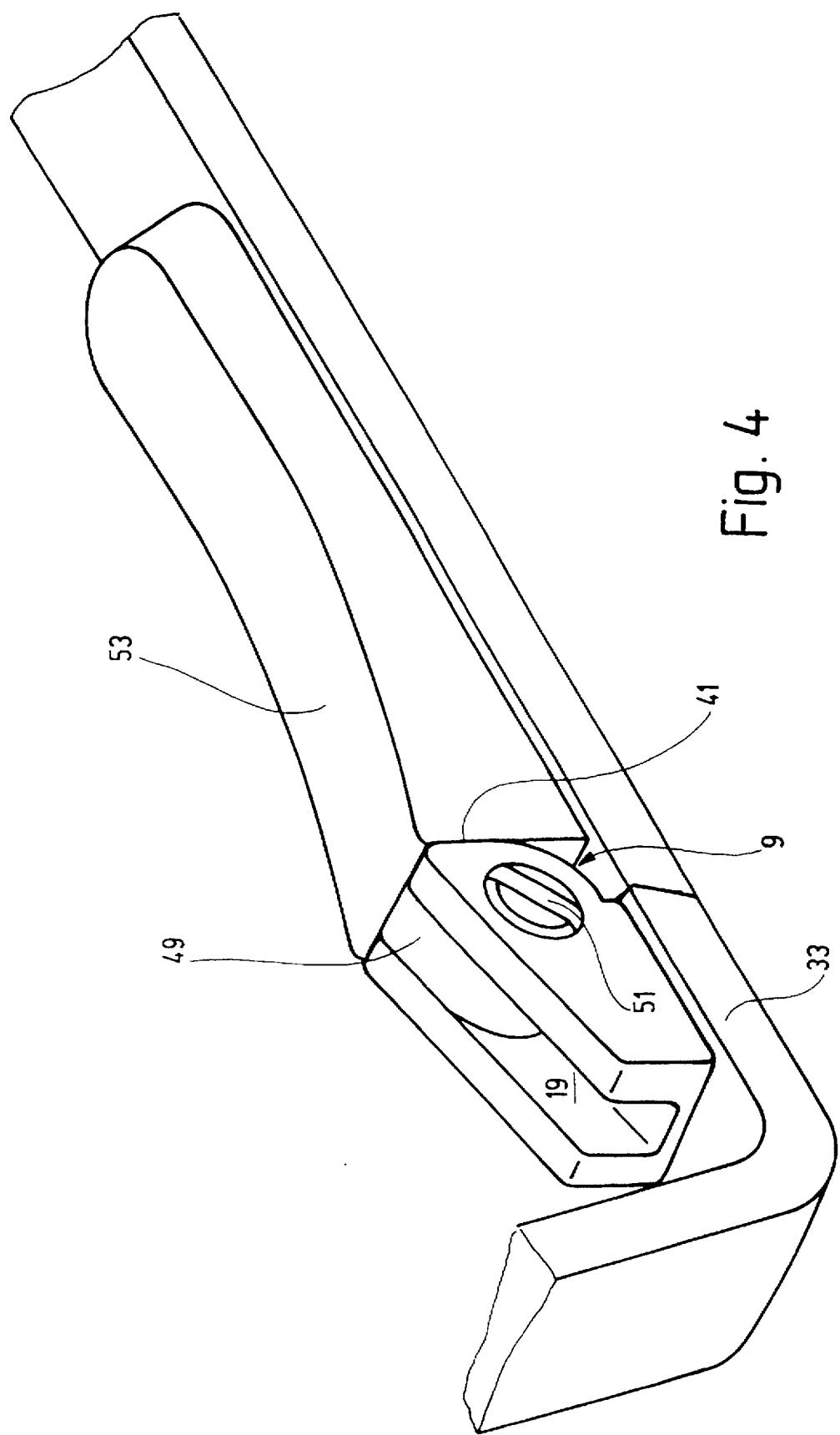

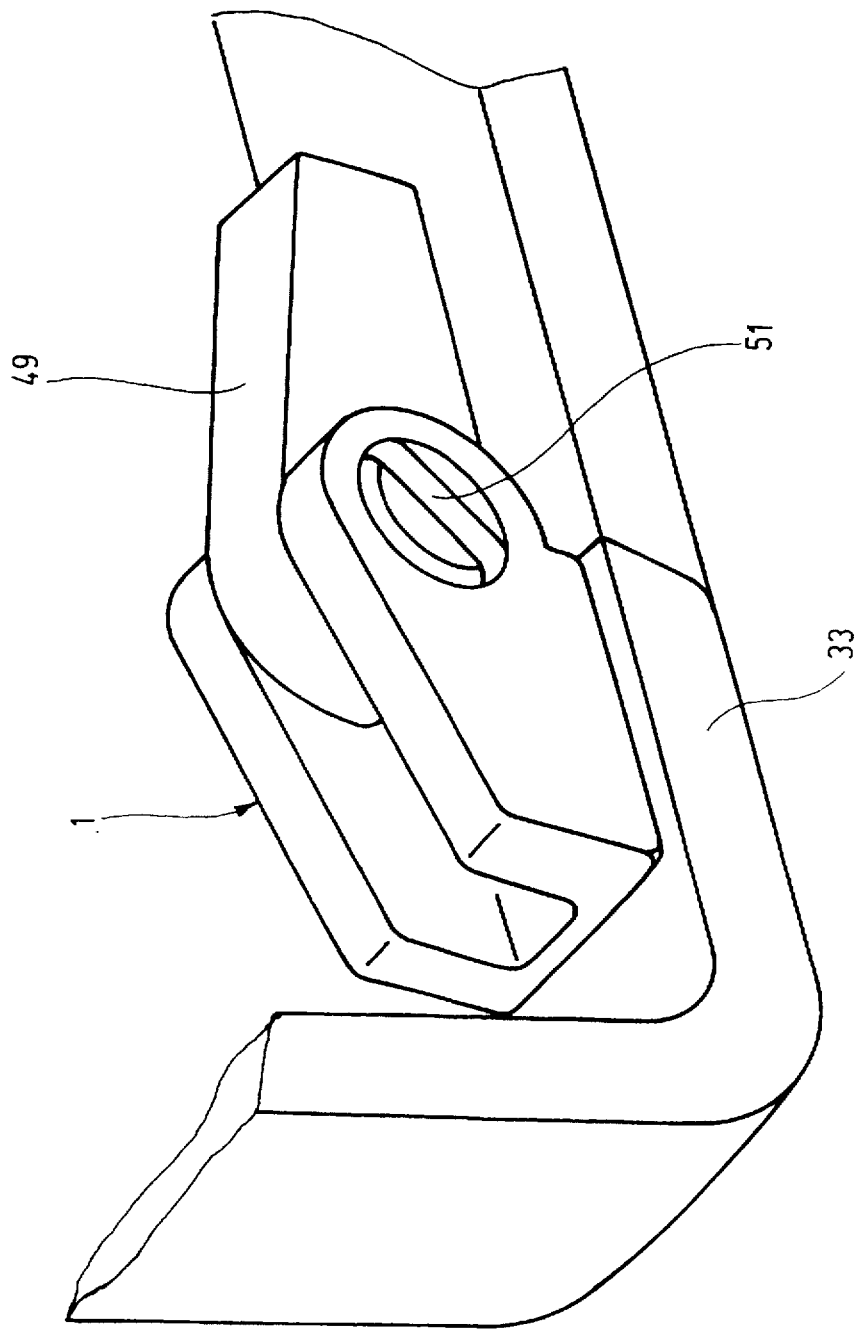

1

METHOD OF MANUFACTURING A HINGE FOR EYEGLASSES

DESCRIPTION

The invention is directed to a method for fabricating a hinge for eyeglasses with a twin roller hinge part, which comprises two legs disposed parallel to one another and a base surface connecting these two legs.

Such hinge parts are known from the state of the art. They are fabricated by sawing a material section off corresponding to the width of the hinge part. Subsequently, a bore is drilled into this sawed-off block, wherein half of the bore is provided with a thread. Subsequently, a slot or slit is produced by sawing radially to the bore, which slit defines the two legs of the twin roller hinge part.

The counterpart of the hinge part engages later on into this intermediate space, wherein it is fixed by a screw so as to be pivotable. Herein, the screw penetrates through a bore of the hinge part, a bore in the counterpart is screwed into the thread of the other bore of the hinge part.

This application method has on the one hand the disadvantage that very expensive section material has to be used. In addition to that, the attainable cycle times are unsatisfactory, wherein in particular the fabrication of the slit forms "the bottle neck" in the manufacturing process.

Another important, not to be neglected, aspect can be seen in that chips accumulate in each machining step. These chips or shavings should be recycled, wherein then the difficulty consists in separating the oil clinging to the chips. This is a substantial disadvantage of the machining type fabrication, which results in an non-negligible expense for the disposal.

Another disadvantage can be seen in that the surfaces produced in the course of drilling or sawing or slitting have a surface roughness, which has an unfavorable effect upon the functioning of the device. If certain materials (for instance, nickel silver without lead) are used, burrs are additionally formed, which require a remachining step.

Therefore, the task of the invention consists in indicating a method for fabricating a spring hinge, which on the one hand is economical and on the other hand permits to attain a high cycling rate. Furthermore, the waste materials accumulating in the course of its manufacture are to be reusable in a simple manner.

This task is solved by the method indicated in claim 1. Since the hinge part is punched out of a strip-shaped material and is then bent, the fabrication process is greatly simplified, so that it can be fabricated on less complicated machinery and at a higher cycling rate in a very economical manner. Furthermore, the fabrication is performed essentially "free or devoid of oil", so that upon recycling, the waste oil separation is no longer necessary. In addition, only very small quantities of solids must be used for cleaning the parts, which has a favorable effect upon the environmental protection.

In addition, materials such as titanium or monel metal, which can not be machined or can only be machined with the greatest difficulty, can be processed. Materials not containing lead can also be processed, which is favorable for the environment. Thus it is also possible to fabricate ornamental hinges.

Compared to the former machine type fabrication methods, one achieves, with a method according to claim 1, a four-fold or six-fold increase of the cycling rate, wherein for instance in a fully automated machining fabrication one machine is capable of producing 20–30 hinge parts per minute, while with the method according to claim 1 approximately 120 pieces per minute can be produced.

Additional advantages result from the refinements of the invention stated in the dependent claims.

Figure 1B:
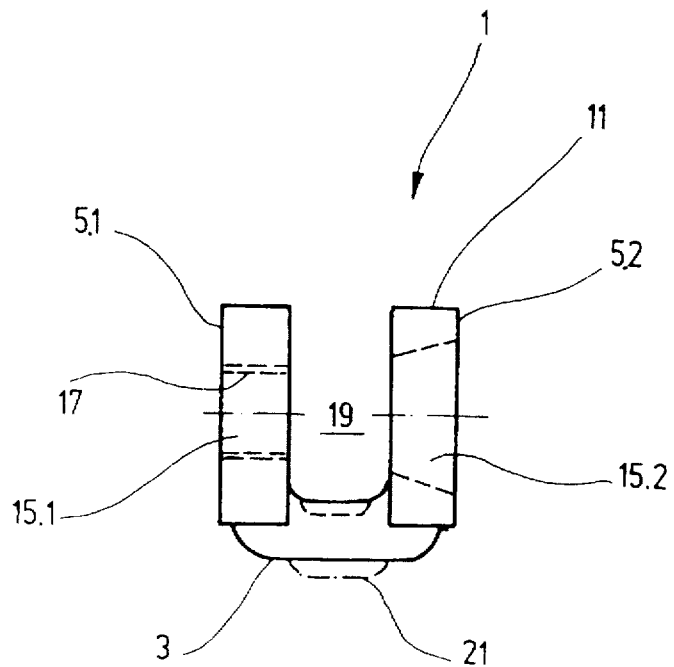

In the following the invention is described with particularity with the help of an embodiment example appearing on the drawing. It is shown on:

FIG. 1a a diagrammatic side view of a hinge part;

FIG. 1b a diagrammatic front view of the hinge part shown in FIG. 1a.

Figure 2:
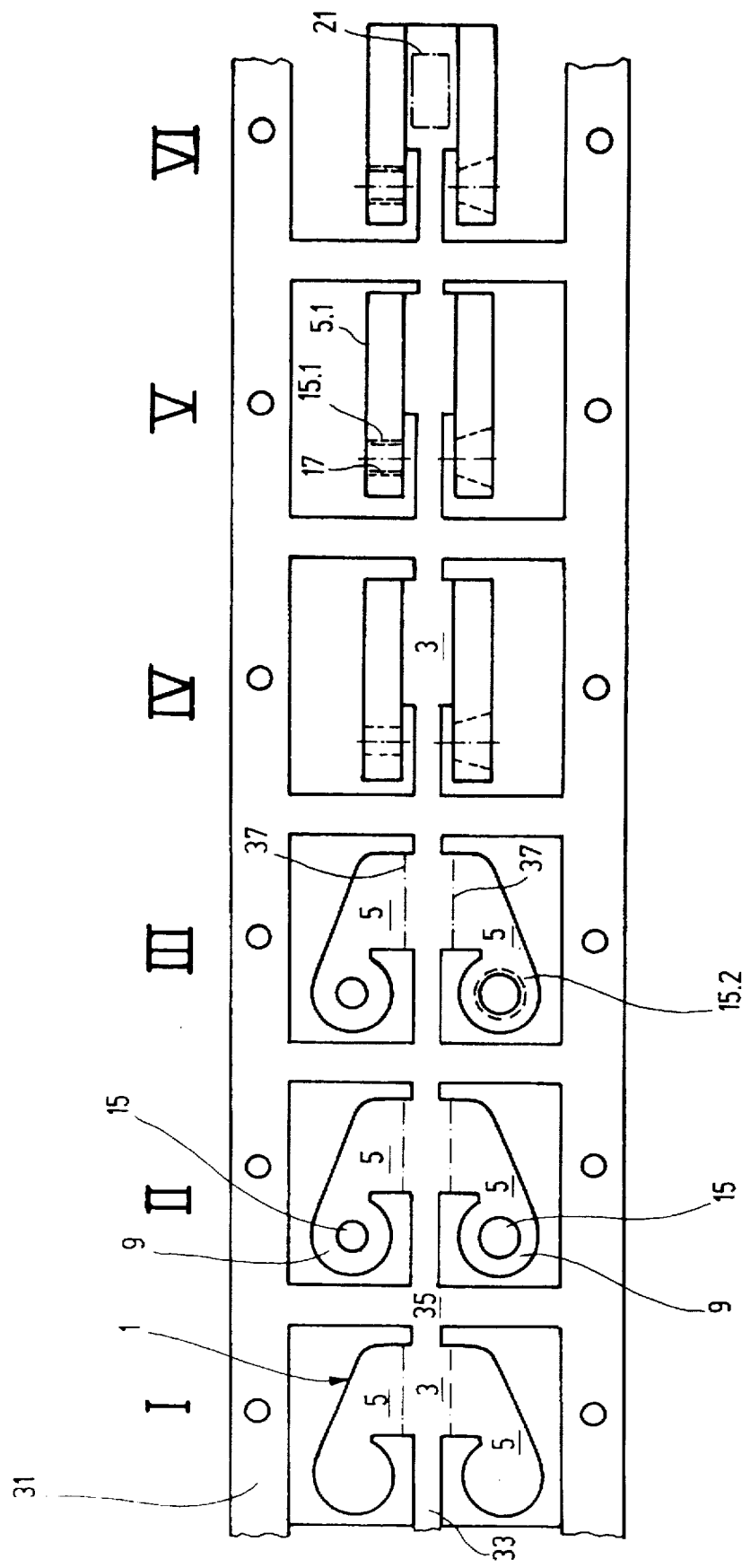
Figure 3:
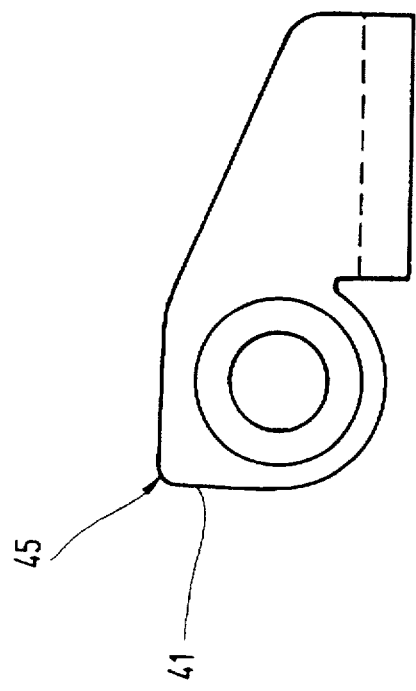
Figure 3:
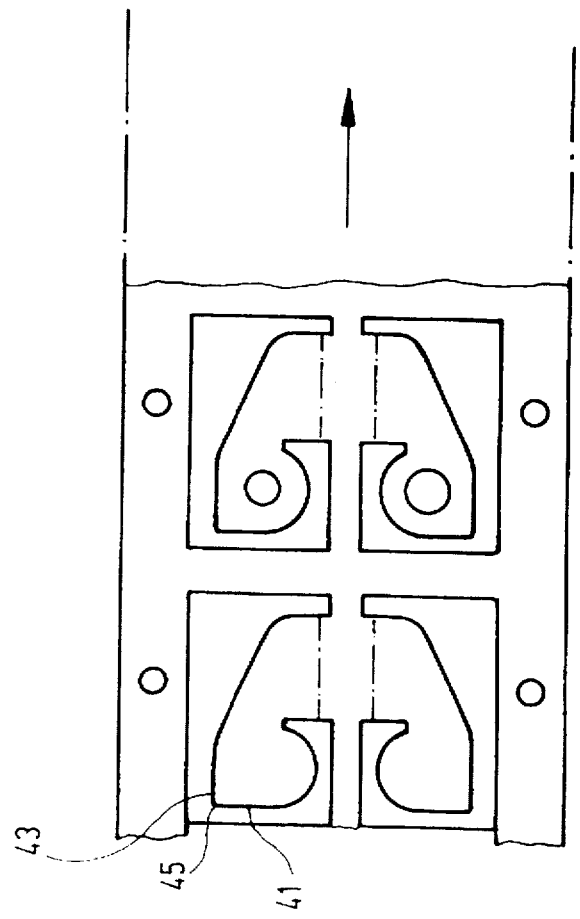

FIG. 2 the sequence of the individual fabrication steps shown diagrammatically,

FIG. 3 an altered form of a punched out hinge part,

FIG. 4 a perspective view of a spring hinge with a twin roller hinge part,

FIG. 5 a perspective view of an eyeglass hinge with a twin roller hinge part.

FIG. 1 shows an already finish-fabricated hinge part 1. It is usually connected fixedly to the eyeglass frame and serves for rotational connecting an eyeglass temple with the eyeglass frame.

The hinge part 1 having a U-shaped cross-section comprises a base surface 3 from which two legs 5.1 and 5.2 emanate, as can be clearly seen in FIG. 1b. These legs 5 extend in longitudinal direction beyond an edge 7 of the base surface 3, wherein this protruding segment 9 terminates in a circular arc shape. It can furthermore be clearly seen in FIG. 1a, that an upper edge 11 of the leg 5 tapers starting with segment 9 towards the edge 13 of the base surface 3 located opposite the edge 7.

Bores 15.1 and 15.2 aligned with each other are provided in the protruding segment 9 of the legs 5, wherein one bore 15.1 has a thread 17. The oppositely located bore 15.2 has in comparison a bore diameter, which increases outwardly from the side facing the leg 15.1 in longitudinal direction of the bore.

The two bores 15 serve for receiving a screw not shown here, whose head is countersunk into the bore 15.2 and whose thread cooperates with the thread in the bore 15.1. The eyeglass temple hinge part extends with its segment comprising the hinge eye into an intermediate space 19 formed by the two legs 5 for the purpose of the rotational attachment of the eyeglass temple to the eyeglass frame. Herein the screw penetrates through this hinge eye and thus fixes the eyeglass temple.

FIG. 1 additionally shows a raised region 21 outlined in broken lines, which protrudes from the bottom side of the base surface 3. This optionally provided segment 21 is used as a welding point, if the hinge part 1 is welded to a web connected with the eyeglass frame.

If the hinge part 1 is to be soldered on, a not shown knurling is applied instead of the welding point, which knurling promotes the flow of the soldering agent.

The fabrication of such a hinge part 1 will now be described with the help of FIG. 2.

A metal strip 31 serves as original material for fabricating the hinge part 1; this metal strip can consist of anyone coated or uncoated metal, for instance, titanium, monel metal (an alloy containing a high proportion of nickel), steel or nickel silver without lead. The thickness of this metal strip 31 is selected so as to correspond to the desired wall thickness, for instance of the legs 5, to be preferably 0.6 mm to 1 mm.

In the first fabrication step I the basic shape of the hinge part 1 is to begin with punched out in the "folded out state", wherein two web 33 and 35 remain standing. They continue to retain the hinge part 1 at the metal strip 31.

Subsequently bores 15 are drilled in this fabrication step II into the segments 9 of the legs 5. This can be accomplished either by drilling or by punching.

The widening of the bore 15.2 shown in FIG. 1b is performed in step III. The broken line is meant herein to indicate this widening.

In the next step IV the two legs 5 are folded upwards along the broken-dotted lines 37, so that they enclose an angle of about 90° with a base surface.

In step V the thread 17 is placed into the bore 15.1 of the leg 5.1 by means of a thread tap or a thread roller. This essentially terminates the fabrication process of the hinge part 1.

In step VI the segment 21 required for welding or a knurling is pressed as needed into the base surface 3.

Subsequently it is only necessary to sever the connection of the hinge part 1 with the metal strip 31 by cutting through the webs 33 and 35. This however, is no longer shown in FIG. 2.

By simply varying the punching tool, a hinge part for a spring hinge can also be fabricated. FIG. 3 shows a correspondingly punched out part, wherein it can be clearly seen that the protruding segment 9 comprises two straight faces 41 and 43. The nose 45 resulting therefrom is required in spring hinges for attaining a snap-effect.

FIG. 4 shows again the twin roller hinge part in perspective view which is attached to the web 33. A hinge part counter piece 49 projects herein into the intermediate space 19, which piece is rotationally fastened by means of screw 51 to the hinge part 1. The hinge part counterpiece 49 projects additionally into a housing 53 of a spring hinge, where it is retained to be displaceable in the known manner.

FIG. 5 shows also a hinge part 1 in perspective view, wherein the hinge part counterpiece 49 is however attached directly to an eyeglass temple. Herein, we are thus dealing with a normal eyeglass hinge.

By using the described punching-bending-method, one thus obtains a hinge part, which can be fabricated in a very simple manner with a few method steps. In addition to this, the inner faces of the legs 5 which serve as moving faces of the hinge remain unmachined or in blank condition. Herein, the high surface quality of the original material is preserved, which results in the good rotational behavior of the temple.

I claim:

1. A method of fabricating an eye-glasses hinge having a twin-roller hinge part with a base surface and two legs, said method comprising the steps of:

punching out the hinge part from a strip material, with the punched-out part remaining connected with the strip material by at least one web;

forming a bore in each of the two legs of the hinge part;

forming a thread in the bore of one of the two legs;

embossing one of a weld point and a soldering knurling in a bottom side of the hinge part to provide for attachment of the hinge part to an eye-glasses frame;

bending out the two legs relative to the base surface by an angle of 90°; and separating the hinge part from the strip material.

2. A method according to claim 1, further comprising the step of widening one side of the bore of the other of the legs.

3. A method according to claim 1 wherein the hinge part punching out step includes punching the hinge part out of a metal strip material.

4. A method according to claim 1, wherein the hinge part punching out step includes punching the hinge part out of a strip material having a thickness from about 0.6 to 1 mm.

\* \* \* \* \*